(12) United States Patent
Ko et al.

(10) Patent No.: US 8,553,620 B2
(45) Date of Patent: Oct. 8, 2013

(54) METHOD FOR TRANSMITTING DATA IN MULTIPLE ANTENNA SYSTEM

(75) Inventors: Hyun Soo Ko, Anyang-si (KR); Jin Young Chun, Anyang-si (KR); Moon Il Lee, Anyang-si (KR); Bin Chul Ihm, Anyang-si (KR); Wook Bong Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 270 days.

(21) Appl. No.: 13/056,306

(22) PCT Filed: Jul. 29, 2009

(86) PCT No.: PCT/KR2009/004233
§ 371 (c)(1), (2), (4) Date: Jan. 27, 2011

(87) PCT Pub. No.: WO2010/013949
PCT Pub. Date: Feb. 4, 2010

(65) Prior Publication Data
US 2011/0128917 A1    Jun. 2, 2011

Related U.S. Application Data

(60) Provisional application No. 61/084,622, filed on Jul. 30, 2008.

(30) Foreign Application Priority Data

May 15, 2009 (KR) .......... 10-2009-0042772

(51) Int. Cl.
H04W 4/00 (2009.01)
H04H 20/67 (2008.01)
H04B 7/216 (2006.01)

(52) U.S. Cl.
USPC .......... 370/328; 370/339; 370/342

(58) Field of Classification Search
USPC .......... 370/203–210, 328–342
See application file for complete search history.

(56) References Cited

U.S. PATENT DOCUMENTS 7,881,395 B2  2/2011  Lee et al.
7,961,808 B2  6/2011  Ihm et al.
(Continued)

FOREIGN PATENT DOCUMENTS

CN  101053193  10/2007
JP  2012514411  6/2012
(Continued)

OTHER PUBLICATIONS

LG Electronics, "Optimal Small Delay Sample for 2Tx CDD-based Precoding", R1-072336, 3GPP TSG RAN WG1 Meeting #49, May 2007.

(Continued)

Primary Examiner — Xavier S. Wong
Assistant Examiner — M Mostazir Rahman
(74) Attorney, Agent, or Firm — Lee, Hong, Degerman, Kang & Waimey

(57) ABSTRACT

A method for transmitting data in a multiple antenna system comprises the steps of: generating a transmission signal in plural antennas through the application of a precoding eight matrix to first and second antenna clusters including the plural antennas, and transmitting the transmission signal. The precoding weight matrix is a block diagonal matrix that is configured in a precoding weight corresponding to first and second antenna clusters respectively. The precoding weight of the first antenna cluster is selected according to a channel condition, and the precoding weight of the second antenna cluster is selected regardless of the channel condition but according to a rule.

5 Claims, 4 Drawing Sheets

(56) References Cited

U.S. PATENT DOCUMENTS

| | | | |
|---|---|---|---|
| 8,111,782 B2* | 2/2012 | Kim et al. | 375/316 |
| 8,363,633 B2* | 1/2013 | Ko et al. | 370/343 |
| 2005/0129138 A1 | 6/2005 | Vaananen et al. | |
| 2006/0039489 A1 | 2/2006 | Ikram et al. | |
| 2007/0189151 A1 | 8/2007 | Pan et al. | |
| 2008/0049709 A1 | 2/2008 | Pan et al. | |
| 2008/0080459 A1 | 4/2008 | Kotecha et al. | |
| 2008/0080634 A1 | 4/2008 | Kotecha et al. | |
| 2008/0089442 A1* | 4/2008 | Lee et al. | 375/299 |
| 2008/0094281 A1 | 4/2008 | Teng et al. | |
| 2008/0095258 A1 | 4/2008 | She et al. | |
| 2008/0198946 A1 | 8/2008 | Lee et al. | |
| 2008/0232492 A1* | 9/2008 | Xiao et al. | 375/260 |
| 2008/0260058 A1 | 10/2008 | Li | |
| 2008/0287075 A1 | 11/2008 | Kim et al. | |
| 2009/0006518 A1 | 1/2009 | Rensburg et al. | |
| 2009/0067402 A1* | 3/2009 | Forenza et al. | 370/343 |
| 2009/0069054 A1* | 3/2009 | Zangi et al. | 455/562.1 |
| 2009/0245153 A1* | 10/2009 | Li et al. | 370/312 |
| 2009/0274230 A1 | 11/2009 | Heath et al. | |
| 2010/0284484 A1* | 11/2010 | Jongren et al. | 375/267 |
| 2011/0058621 A1 | 3/2011 | Clerckx et al. | |
| 2012/0114060 A1* | 5/2012 | Zangi et al. | 375/285 |
| 2012/0188883 A1* | 7/2012 | Sampath et al. | 370/252 |

FOREIGN PATENT DOCUMENTS

| | | |
|---|---|---|
| KR | 1020070113941 | 11/2007 |
| KR | 1020080026010 | 3/2008 |
| KR | 1020080036499 | 4/2008 |
| KR | 1020080039711 | 5/2008 |
| WO | 03-021795 A2 | 3/2003 |
| WO | 2005-076758 A2 | 8/2005 |
| WO | 2008-044830 A1 | 4/2008 |
| WO | 2010/076778 | 7/2010 |
| WO | 2010076778 | 7/2010 |

OTHER PUBLICATIONS

3rd Generation Partnership Project (3GPP); "Technical Specification Group Radio Access Network; Physical Channels and Modulation (Release 8)", 3GPP TS 36.211, v0.4.1, Feb. 2007.

InterDigital Communications, LLC, "E-UTRA PUCCH: ACK/NACK, CQI, PMI, and RI Issues", R1-074391, 3GPP TSG RAN WG1 Meeting #50bis, Oct. 2007.

NTT DoCoMo et al., "Investigation on Frequency Granularity of SU-MIMO Precoding in E-UTRA Downlink", R1-073707, 3GPP TSG RAN WG1 Meeting #50, Aug. 2007.

NTT DoCoMo et al., "Adaptive Beamforming in E-UTRA", R1-070859, 3GPP TSG RAN WG1 Meeting #48, Feb. 2007.

QUALCOMM Europe, "Final Details on CDD Precoding", R1-080462, 3GPP TSG-RAN WG1 #51bis, Jan. 2008.

Samsung, "Way Forward for MU-MIMO Design", R1-073100, 3GPP TSG RAN WG1 Meeting #49bis, Jun. 2007, 4 pages.

Bishwarp Mondal et al., "Rank Independent Codebook Design from a Quaternary Alphabet", Signals, Systems and Computers, 2007, ACSSC 2007, Conference, Nov. 2007, 6 pages.

Japan Patent Office Application Serial No. 2011-521025, Office Action dated Oct. 30, 2012, 3 pages.

United States Patent and Trademark Office U.S. Appl. No. 13/462,731, Office Action dated Nov. 29, 2012, 11 pages.

Japan Patent Office Application Serial No. 2011-521025, Office Action dated Feb. 19, 2013, 4 pages.

3rd Generation Partnership Project (3GPP); "Technical Specification Group Radio Access Network; Physical Channels and Modulation (Release 8)," 3GPP TS 36.211 V1.1.0 , May 2007, 34 pages.

The State Intellectual Property Office of the People's Republic of China Application Serial No. 200980133934.X, Office Action dated Feb. 27, 2013, 13 pages.

NTT DoCoMo, et al., "Adaptive Beamforming in E-UTRA," 3GPP TSG RAN WG1 Meeting #48, R1-070859, Feb. 2007, 8 pages.

* cited by examiner

METHOD FOR TRANSMITTING DATA IN MULTIPLE ANTENNA SYSTEM

This application is the National Stage filing under 35 U.S.C. 371 of International Application No. PCT/KR2009/004233, filed on Jul. 29, 2009, which claims the benefit of earlier filing date and right of priority to Korean Patent Application No. 10-2009-0042772, filed on May 15, 2009, and also claims the benefit of U.S. Provisional Application Ser. No. 61/084,622, filed on Jul. 30, 2008, the contents of which are all hereby incorporated by reference herein in their entirety.

TECHNICAL FIELD

The present invention relates to wireless communications, and more particularly, to a data transmission method using multiple antennas.

BACKGROUND ART

To maximize performance and communication capability of a wireless communication system, a multiple input multiple output (MIMO) system has drawn attention in recent years. Being evolved from the conventional technique in which a single transmit (Tx) antenna and a single receive (Rx) antenna are used, a MIMO technique uses multiple Tx antennas and multiple Rx antennas to improve transfer efficiency of data to be transmitted or received. The MIMO system is also referred to as a multiple antenna system. In the MIMO technique, instead of receiving one whole message through a single antenna path, data segments are received through a plurality of antennas and are then collected as one piece of data. As a result, a data transfer rate can be improved in a specific range, or a system range can be increased with respect to a specific data transfer rate.

The MIMO technique includes transmit diversity, spatial multiplexing, and beamforming. The transmit diversity is a technique in which the multiple Tx antennas transmit the same data so that transmission reliability increases. The spatial multiplexing is a technique in which the multiple Tx antennas simultaneously transmit different data so that data can be transmitted at a high speed without increasing a system bandwidth. The beamforming is used to add a weight to multiple antennas according to a channel condition so as to increase a signal to interference plus noise ratio (SINR) of a signal. In this case, the weight can be expressed by a weight vector or a weight matrix, which is respectively referred to as a precoding vector or a precoding matrix.

The spatial multiplexing is classified into single-user spatial multiplexing and multi-user spatial multiplexing. The single-user spatial multiplexing is also referred to as a single user MIMO (SU-MIMO). The multi-user spatial multiplexing is also referred to as a spatial division multiple access (SDMA) or a multi user MIMO (MU-MIMO). A capacity of a MIMO channel increases in proportion to the number of antennas. The MIMO channel can be decomposed into independent channels. If the number of Tx antennas is Nt, and the number of Rx antennas is Nr, then the number of independent channels is Ni, where Ni≤min{Nt, Mr}. Each independent channel can be referred to as a spatial layer. A rank represents the number of non-zero eigen-values of the MIMO channel and can be defined as the number of spatial streams that can be multiplexed.

The MIMO technique includes a codebook-based precoding scheme. The codebook-based precoding scheme transmits a precoding matrix indicator (PMI) by selecting a precoding matrix which is the most similar to a MIMO channel among predetermined precoding matrixes, and can reduce overhead of feedback data. The codebook consists of a codebook set capable of representing a spatial channel. The number of antennas has to be increased to obtain a higher data transfer rate. The greater the number of antennas, the greater the number of codebook sets used to configure the codebook. The increase of the codebook set along with the increase of the number of antennas results in the increase of the overhead of the feedback data and also results in the difficulty in the designing of the codebook.

Accordingly, there is a need for a method for effectively applying the codebook-based precoding scheme in a multiple antenna system requiring a greater number of antennas than the conventional antenna system.

DISCLOSURE

Technical Problem

The present invention provides a method for effectively applying a codebook-based precoding scheme to an increased number of multiple antennas.

Technical Solution

A data transmission method in a multiple antenna system according to an aspect of the present invention include generating a transmit (Tx) signal in a plurality of antennas by applying a precoding weight matrix to a first and second antenna clusters including the plurality of antennas, wherein the precoding weight matrix is a block diagonal matrix that is configured with precoding weights corresponding to the first and second antenna clusters respectively, and the precoding weight of the first antenna cluster is selected according to a channel condition, and the precoding weight of the second antenna cluster is selected according to a specific rule irrespective of the channel condition, and transmitting the Tx signal.

A data transmission method in a multiple antenna system according to another aspect of the present invention include receiving a receive (Rx) signal from a transmitter including first and second antenna clusters configured by aggregating a plurality of antennas in a plurality of groups, wherein a precoding weight of the first antenna cluster is selected according to a channel condition, and a precoding weight of the second antenna cluster is selected according to a specific rule irrespective of the channel condition, and transmitting feedback data including a precoding matrix indicator (PMI) for the first antenna cluster by estimating a channel for the Rx signal.

Advantageous Effects

According to the present invention, a scheduling gain for opportunistic beamforming and a throughput obtained by channel-dependent precoding can be maximized by using channel-independent precoding for some of precoding weights and by using channel-dependent precoding for the remaining precoding weights.

MODE FOR INVENTION

Figure 1:
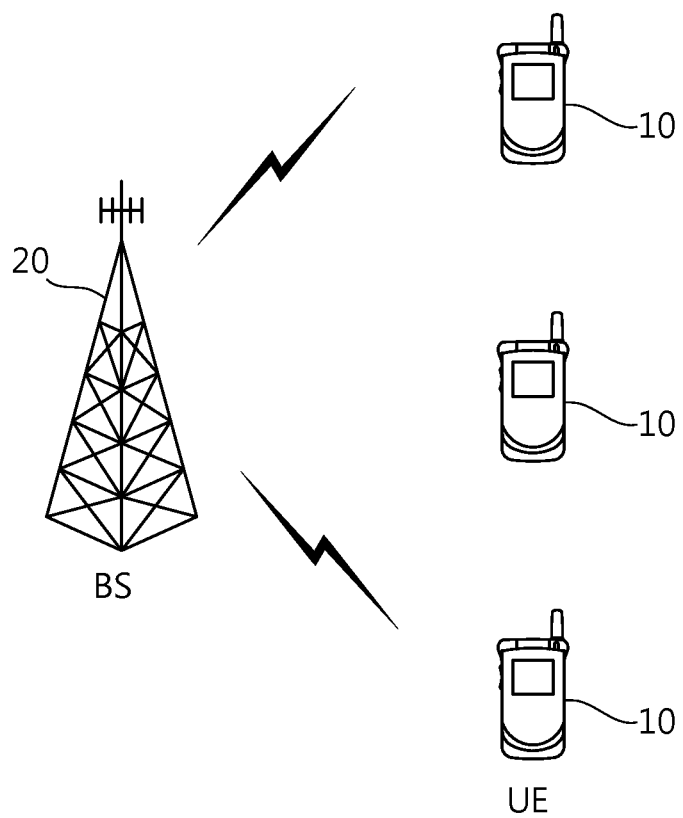
FIG. 1 shows a wireless communication system.

FIG. 1 shows a wireless communication system. The wireless communication system can be widely deployed to provide a variety of communication services, such as voices, packet data, etc.

Referring to FIG. 1, the wireless communication system includes at least one user equipment (UE) 10 and a base station (BS) 20. The UE 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as a node-B, a base transceiver system (BTS), an access point, etc. There are one or more cells within the coverage of the BS 20.

Hereinafter, a downlink (DL) denotes a communication link from the BS 20 to the UE 10, and an uplink (UL) denotes a communication link from the UE 10 to the BS 20. In the DL, a transmitter may be a part of the BS 20, and a receiver may be a part of the UE 10. In the UL, the transmitter may be a part of the UE 10, and the receiver may be a part of the BS 20.

The wireless communication system may be a system based on orthogonal frequency division multiplexing (OFDM)/orthogonal frequency division multiple access (OFDMA). The OFDM uses a plurality of orthogonal subcarriers. Further, the OFDM uses an orthogonality between inverse fast Fourier transform (IFFT) and fast Fourier transform (FFT). The transmitter transmits data by performing IFFT on the data. The receiver restores original data by performing FFT on a received signal. The transmitter uses IFFT to combine the plurality of subcarriers, and the receiver uses FFT to split the plurality of subcarriers.

The wireless communication system may be a multiple antenna system. The multiple antenna system may be a multiple input multiple output (MIMO) system. The multiple antenna system may be a multiple-input single-output (MISO) system, a single-input single-output (SISO) system, or a single-input multiple-output (SIMO) system. The MIMO system uses a plurality of transmit (Tx) antennas and a plurality of receive (Rx) antennas. The MISO system uses a plurality of Tx antennas and one Rx antenna. The SISO system uses one Tx antenna and one Rx antenna. The SIMO system uses one Tx antenna and a plurality of Rx antennas.

The multiple antenna system can use a scheme using multiple antennas. In case of a rank 1, the scheme may be space-time coding (STC) (e.g., space frequency block code (SFBC) and space time block code (STBC)), cyclic delay diversity (CDD), frequency switched transmit diversity (FSTD), time switched transmit diversity (TSTD), etc. In case of a rank 2 or higher ranks, the scheme may be spatial multiplexing (SM), generalized cyclic delay diversity (GCDD), selective virtual antenna permutation (S-VAP), etc. The SFBC is a scheme for effectively applying selectivity in a space domain and a frequency domain to ensure both a diversity gain and a multi-user scheduling gain in a corresponding dimension. The STBC is a scheme for applying selectivity in the space domain and a time domain. The FSTD is a scheme in which signals transmitted to multiple antennas are divided in the time domain, and the TSTD is a scheme in which the signals transmitted to the multiple antennas are divided in the frequency domain. The SM is a scheme for transmitting different data to each antenna to improve a transfer rate. The GCDD is a scheme for applying selectivity in the time domain and the frequency domain. The S-VAP is a scheme using a single precoding matrix, and includes a multi-codeword (MCW) S-VAP for mixing multi-codewords to antennas in spatial diversity or spatial multiplexing and a single codeword (SCW) S-VAP using a single codeword.

Figure 2:
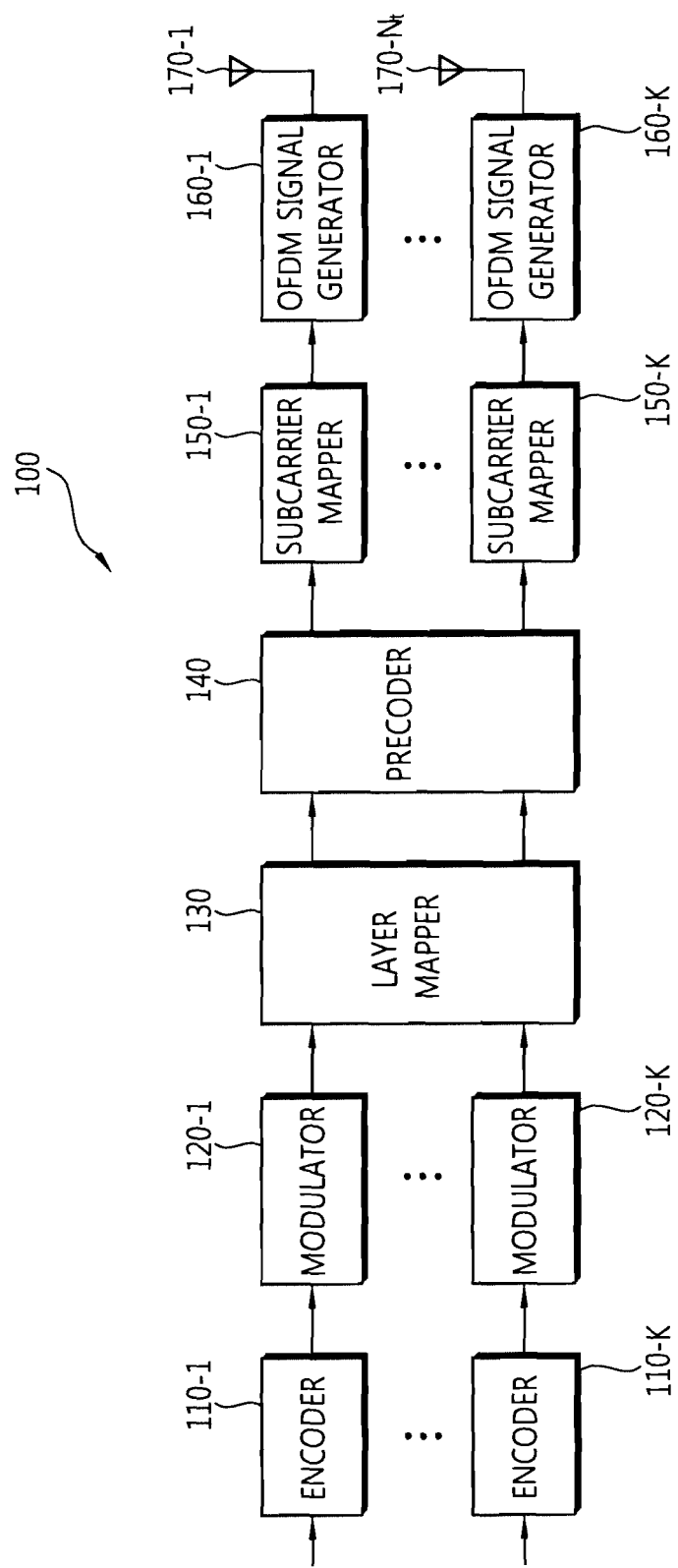
FIG. 2 shows an example of a structure of a transmitter.

FIG. 2 shows an example of a structure of a transmitter.

Referring to FIG. 2, a transmitter 100 includes encoders 110-1, ..., 110-K, modulators 120-1, ..., 120-K, a layer mapper 130, a precoder 140, subcarrier mappers 150-1, ..., 150-K, and OFDM signal generators 160-1, ..., 160-K. The transmitter 100 also includes Nt (Nt>1) Tx antennas 170-1, ..., 170-Nt.

The encoders 110-1, ..., 110-K generate coded data by encoding input data according to a predetermined coding scheme. The coded data is referred to as a codeword (CW). A CW b can be expressed by Equation 1 below.

$$b^{(q)}(0), \ldots, b^{(q)}(M_{bit}^{(q)}-1) \qquad \text{[Equation 1]}$$

In Equation 1, q denotes a CW index, and $M_{bit}^{(q)}$ denotes the number of bits of a CW q.

Scrambling is performed on the CW. A scrambled CW c can be expressed by Equation 2 below.

$$c^{(q)}(0), \ldots, c^{(q)}(M_{bit}^{(q)}-1) \qquad \text{[Equation 2]}$$

The modulators 120-1, ..., 120-K arrange the coded data into symbols representing locations on a signal constellation. A modulation scheme is not limited to a specific modulation scheme, and may be an m-phase shift keying (m-PSK) or an m-quadrature amplitude modulation (m-QAM). For example, the m-PSK may be binary PSK (BPSK), quadrature PSK (QPSK), or 8-PSK. The m-QAM may be 16-QAM, 64-QAM, or 256-QAM A CW d arranged to the symbol on the signal constellation can be expressed by Equation 3 below.

$$d^{(q)}(0), \ldots, d^{(q)}(M_{symb}^{(q)}-1) \qquad \text{[Equation 3]}$$

In Equation 3, $M_{symb}^{(q)}$ denotes the number of symbols of the CW q.

The layer mapper 130 defines a layer of an input symbol so that each antenna can distribute a specific symbol to a path of each antenna. The layer is defined as an information path input to the precoder 140. A symbol x input to the path of each antenna can be expressed by Equation 4 below.

$$x(i)=[x^{(0)}(i) \ldots x^{(v-1)}(i)]^T \qquad \text{[Equation 4]}$$

In Equation 4, v denotes the number of layers.

The information path located ahead of the precoder 140 can be called a virtual antenna (or a layer). The precoder 140 processes an input symbol by using a MIMO scheme according to the multiple Tx antennas 170-1, ..., 170-Nt. For example, the precoder 140 can use codebook-based precoding. The precoder 140 distributes an antenna-specific symbol to the subcarrier mappers 150-1, ..., 150-K for a path of a specific antenna. Each information path transmitted to one antenna by the precoder 140 by the use of one subcarrier mapper is called a stream. The antenna may be a physical antenna.

A signal $y^{(p)}(i)$ sent to each antenna port p can be expressed by Equation 5 below.

$$y(i)=[\ldots y^{(p)}(i) \ldots]^T \qquad \text{[Equation 5]}$$

The subcarrier mappers 150-1, ..., 150-K allocate input symbols to relevant subcarriers and then multiplex the resultant symbols according to a user. The OFDM signal generators 160-1, ..., 160-K modulate input symbols according to an OFDM scheme and then outputs OFDM symbols. The OFDM signal generators 160-1, ..., 160-K can perform IFFT on input symbols. A cyclic prefix (CP) may be inserted into a time-domain symbol which has undergone the IFFT. The OFDM symbols are transmitted through the respective Tx antennas 170-1, . . . , 170-Nt.

In the MIMO system, the transmitter 100 can operate in two modes. One is an SCW mode and the other is an MCW mode. In the SCW mode, Tx signals transmitted through a MIMO channel have the same data rate. In the MCW mode, data transmitted through the MIMO channel is independently encoded, and thus the Tx signals can have different data rates. The MCW mode operates when a rank is greater than or equal to 2.

Figure 3:
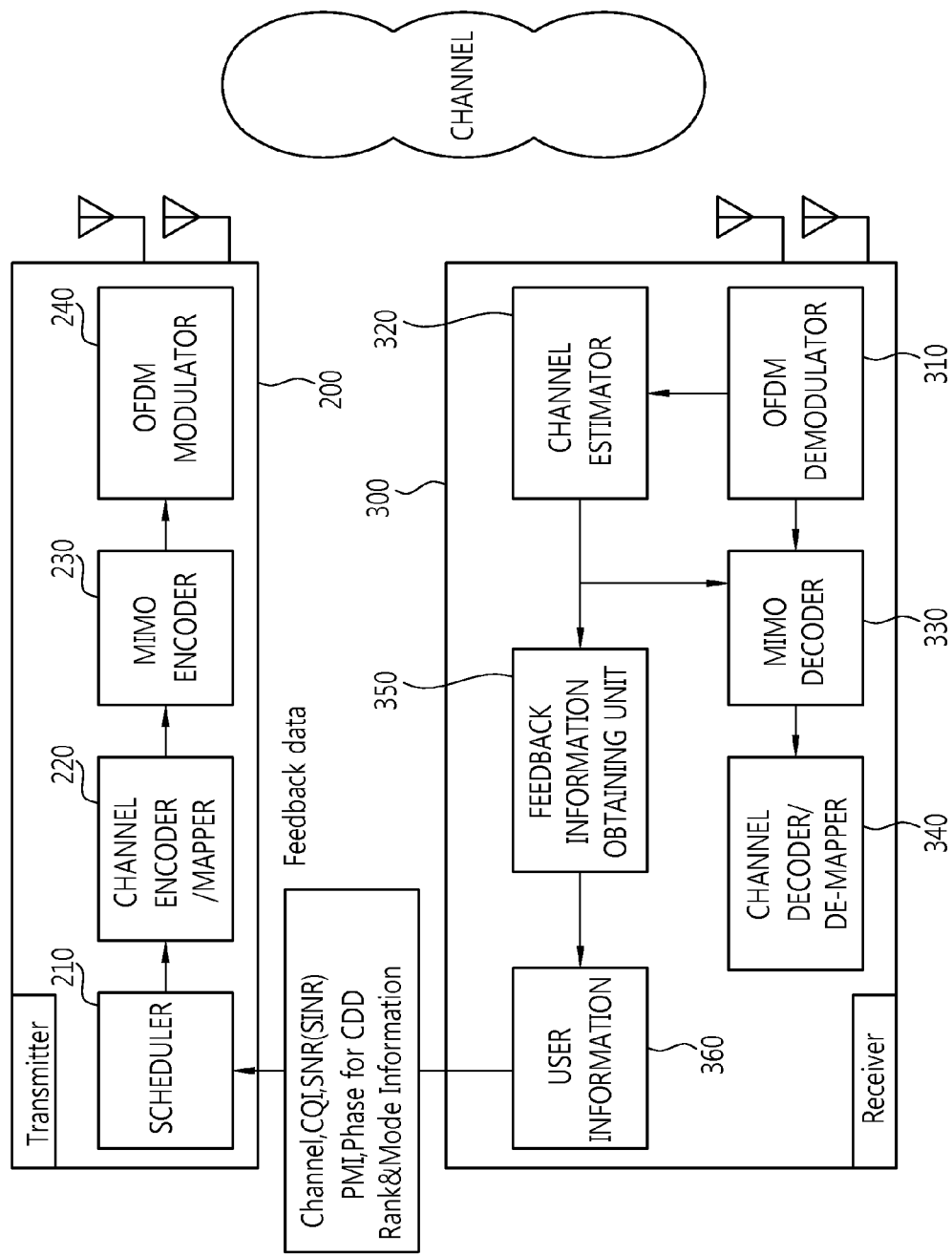
FIG. 3 shows data processing between a transmitter and a receiver in a multiple antenna system.

FIG. 3 shows data processing between a transmitter and a receiver in a multiple antenna system.

Referring to FIG. 3, a transmitter 200 includes a scheduler 210, a channel encoder/mapper 220, a MIMO encoder 230, and an OFDM modulator 240. The transmitter 200 includes Nt(Nt>1) Tx antennas. The transmitter 200 may be a part of a BS in a downlink, and may be a part of a UE in an uplink.

The scheduler 210 receives data from N users, and outputs K streams to be transmitted concurrently. The scheduler 210 determines a data transfer rate and a user for transmission using an available radio resource by the use of channel information of each user. The scheduler 210 selects a code rate, a modulation and coding scheme (MCS), etc., by extracting the channel information from feedback data. For an operation of a MIMO system, the feedback data may include control information such as a channel quality indicator (CQI), channel state information (CSI), a channel covariance matrix, a precoding weight, a channel rank, etc. Examples of the CSI include a channel matrix between the transmitter and the receiver, a channel correlation matrix of a channel, a quantized channel matrix, a quantized channel correlation matrix, etc. Examples of the CQI include a signal to noise ratio (SNR) between the transmitter and the receiver, a signal to interference and noise ratio (SINR), etc.

The available radio resource allocated by the scheduler implies a radio resource used at data transmission in the wireless communication system. For example, each time slot is the resource in a time division multiple access (TDMA) system, each code and each time slot are the resource in a code division multiple access (CDMA) system, and each subcarrier and each time slot are the resource in an orthogonal frequency division multiple access (OFDMA) system. To avoid interference to other users in the same cell or sector, the respective resources may be defined to be orthogonal in a time, code, or frequency domain.

The channel encoder/mapper 220 generates coded data by encoding an input stream according to a predetermined coding scheme, and maps the coded data to a symbol for expressing a position on a signal constellation. The MIMO encoder 230 performs precoding on the input symbol. The precoding is a scheme of performing pre-processing on a symbol to be transmitted. Examples of the precoding scheme include random beamforming (RBF), zero forcing beamforming (ZFBF), etc., for generating a symbol by applying a weight vector, a precoding matrix, etc. Codebook-based precoding that uses a predetermined codebook set may be used as the precoding scheme.

The OFDM modulator 240 transmits the input symbol through the Tx antenna by allocating the symbol to a relevant subcarrier.

A receiver 300 includes an OFDM demodulator 310, a channel estimator 320, a MIMO decoder 330, a channel decoder/de-mapper 340, and a feedback information obtaining unit 350. The receiver 300 includes Nr(Nr>1) Rx antennas. The receiver 300 may be a part of the UE in the downlink, and may be a part of the BS in the uplink.

A signal received through the Rx antenna is demodulated by the OFDM demodulator 310. The channel estimator 320 estimates a channel. The MIMO decoder 330 performs post-processing as opposed to the operation of the MIMO encoder 230. The decoder/de-mapper 340 de-maps the input symbol from the coded data and decodes the coded data, thereby restoring original data. The feedback information obtaining unit 350 generates user information 360 including a CSI, a CQI, a PMI, etc. The generated user information 360 is configured as the feedback data and is transmitted to the transmitter 200.

<Feedback Data of MIMO-OFDM System>

Control information such as a CQI, a CSI, a channel covariance matrix, a precoding weight, a channel rank, etc., is required for an operation of a MIMO-OFDM system. In a frequency division duplex (FDD) system, a receiver reports such information through a feedback channel. A time division duplex (TDD) system can obtain information to be used in downlink transmission by estimating an uplink channel by the use of a reciprocity property of the channel.

The CQI is necessary for resource allocation and link adaptation. SNR/SINR or the like may be used as the CQI. The SNR/SINR may be defined as a 4-bit CQI by being quantized with an interval of 1.89 dB at 16 levels. The receiver reports a CQI index defined after quantization of the SNR/SINR to the transmitter. In addition, when using the MIMO scheme, up to 2 CWs can be supported. That is, for transmission of a rank 2 or higher ranks, CQIs of a first CW and a second CW have to be reported to the transmitter. The first CW may be expressed in 4 bits. The second CW is a value indicating a difference to the $1^{st}$ CW and may be expressed in 3 bits.

A precoding scheme is a MIMO technique for transmitting a Tx data stream by performing pre-processing by using a pre-processing weight. Equation 6 shows a precoding scheme for performing pre-processing on a Tx data stream x by using the pre-processing weight.

$$\begin{bmatrix} y^{(0)}(i) \\ \vdots \\ y^{(P-1)}(i) \end{bmatrix} = W(i) \begin{bmatrix} x^{(0)}(i) \\ \vdots \\ x^{(v-1)}(i) \end{bmatrix} \text{ where,} \quad \text{[Equation 6]}$$

$$i = 0, 1, \ldots, M_{symb}^{layer}$$

In Equation 6, W(i) denotes a precoding matrix. A DFT matrix U and a diversity matrix D(i) for a cyclic delay diversity (CDD) can be used in a pre-processed Tx data stream y as shown in Equation 7.

$$\begin{bmatrix} y^{(0)}(i) \\ \vdots \\ y^{(P-1)}(i) \end{bmatrix} = W(i)D(i)U \begin{bmatrix} x^{(0)}(i) \\ \vdots \\ x^{(v-1)}(i) \end{bmatrix} \quad \text{[Equation 7]}$$

D(i) and U can be determined according to a transport layer.

Equation 8 shows an example of generating the precoding matrix W(i) according to the rank.

$$W(i) = C_k \quad \text{[Equation 8]}$$

$$k = \left( \left\lfloor \frac{i}{v} \right\rfloor \mod 4 \right) + 1, \text{ where } k = 1, 2, 3, 4.$$

In Equation 8, $C_1$, $C_2$, $C_3$, and $C_4$ denote precoding matrixes corresponding to precoder indices 12, 13, 14, and 15, and u denotes the rank (or the transport layer).

Table 1 shows an example of the DFT matrix U and the delay matrix D(i) for the CDD applied according to the transport layer.

TABLE 1

| Number of layers $v$ | U | D(i) |
|---|---|---|
| 2 | $\frac{1}{\sqrt{2}}\begin{bmatrix} 1 & 1 \\ 1 & e^{-j2\pi/2} \end{bmatrix}$ | $\begin{bmatrix} 1 & 0 \\ 0 & e^{-j2\pi i/2} \end{bmatrix}$ |
| 3 | $\frac{1}{\sqrt{3}}\begin{bmatrix} 1 & 1 & 1 \\ 1 & e^{-j2\pi/3} & e^{-j4\pi/3} \\ 1 & e^{-j4\pi/3} & e^{-j8\pi/3} \end{bmatrix}$ | $\begin{bmatrix} 1 & 0 & 0 \\ 0 & e^{-j2\pi i/3} & 0 \\ 0 & 0 & e^{-j4\pi i/3} \end{bmatrix}$ |
| 4 | $\frac{1}{2}\begin{bmatrix} 1 & 1 & 1 & 1 \\ 1 & e^{-j2\pi/4} & e^{-j4\pi/4} & e^{-j6\pi/4} \\ 1 & e^{-j4\pi/4} & e^{-j8\pi/4} & e^{-j12\pi/4} \\ 1 & e^{-j6\pi/4} & e^{-j12\pi/4} & e^{-j18\pi/4} \end{bmatrix}$ | $\begin{bmatrix} 1 & 0 & 0 & 0 \\ 0 & e^{-j2\pi i/4} & 0 & 0 \\ 0 & 0 & e^{-j4\pi i/4} & 0 \\ 0 & 0 & 0 & e^{-j6\pi i/4} \end{bmatrix}$ |

According to a method of generating a precoding weight, there are various schemes such as zero forcing beamforming, eigen beamforming, and codebook-based precoding, etc. A CSI, a channel variance matrix, a codebook index, etc., are required to apply each scheme. In the conventional system, the codebook-based precoding is supported in 2Tx MIMO transmission and 4Tx MIMO transmission. For this, codebooks are respectively defined for 2Tx/4Tx.

In codebook-based precoding, the receiver has several predetermined precoding matrixes. The receiver estimates a channel by using a signal transmitted from the transmitter and determines a precoding matrix which is the most similar to an estimated channel state. The receiver feeds back a determined precoding matrix index (PMI) to the transmitter. The transmitter transmits data by selecting a codebook suitable for the fed-back precoding matrix. In the codebook-based precoding, an amount of feedback data decreases since only the PMI is transmitted. In the codebook-based precoding scheme, system performance varies depending on a codebook configuration method, a type of a codebook, and a size of the codebook. When using the codebook-based precoding scheme, performance deterioration may occur if the codebook does not fully reveal a channel state. However, if the size of the codebook increases, the performance can approach to optimal performance since the channel state can be fully revealed. Therefore, there is a need to design a codebook capable of approaching to the optimal performance while sufficiently decreasing the amount of feedback data.

The greater the number of Tx antennas, the greater the size of the required codebook. In 2Tx transmission of the conventional system, a codebook having 4 precoding matrixes is defined for a rank 1, and a codebook having 3 precoding matrixes is defined for a rank 2. In 4Tx transmission, codebooks each having 16 precoding matrixes are defined for ranks 1 to 4. Table 2 shows an example of a codebook for 4Tx MIMO.

TABLE 2

| Codebook Index | Number of Layers | | | |
|---|---|---|---|---|
| | 1 | 2 | 3 | 4 |
| 0 | $\begin{bmatrix} 1 \\ 1 \\ 1 \\ 1 \end{bmatrix}$ | $\frac{1}{\sqrt{2}}\begin{bmatrix} 1 & 1 \\ 1 & -1 \\ 1 & -1 \\ 1 & 1 \end{bmatrix}$ | $\frac{1}{\sqrt{3}}\begin{bmatrix} 1 & 1 & 1 \\ 1 & 1 & -1 \\ 1 & -1 & -1 \\ 1 & -1 & 1 \end{bmatrix}$ | $\frac{1}{\sqrt{4}}\begin{bmatrix} 1 & 1 & 1 & 1 \\ 1 & 1 & -1 & -1 \\ 1 & -1 & 1 & -1 \\ 1 & -1 & -1 & 1 \end{bmatrix}$ |
| 1 | $\begin{bmatrix} 1 \\ -j \\ -1 \\ j \end{bmatrix}$ | $\frac{1}{\sqrt{2}}\begin{bmatrix} 1 & j \\ -j & 1 \\ -1 & j \\ j & 1 \end{bmatrix}$ | $\frac{1}{\sqrt{3}}\begin{bmatrix} 1 & j & -1 \\ -j & 1 & -j \\ -1 & j & 1 \\ j & 1 & j \end{bmatrix}$ | $\frac{1}{\sqrt{4}}\begin{bmatrix} 1 & j & -1 & -j \\ -j & 1 & -j & 1 \\ -1 & j & 1 & -j \\ j & 1 & j & 1 \end{bmatrix}$ |
| 2 | $\begin{bmatrix} 1 \\ -1 \\ 1 \\ -1 \end{bmatrix}$ | $\frac{1}{\sqrt{2}}\begin{bmatrix} 1 & -1 \\ -1 & 1 \\ 1 & 1 \\ -1 & -1 \end{bmatrix}$ | $\frac{1}{\sqrt{3}}\begin{bmatrix} 1 & -1 & 1 \\ -1 & 1 & 1 \\ 1 & 1 & 1 \\ -1 & -1 & 1 \end{bmatrix}$ | $\frac{1}{\sqrt{4}}\begin{bmatrix} 1 & -1 & 1 & -1 \\ -1 & 1 & 1 & -1 \\ 1 & 1 & 1 & 1 \\ -1 & -1 & 1 & 1 \end{bmatrix}$ |
| 3 | $\begin{bmatrix} 1 \\ j \\ -1 \\ -j \end{bmatrix}$ | $\frac{1}{\sqrt{2}}\begin{bmatrix} 1 & -j \\ j & 1 \\ -1 & -j \\ -j & 1 \end{bmatrix}$ | $\frac{1}{\sqrt{3}}\begin{bmatrix} 1 & -j & -1 \\ j & 1 & j \\ -1 & -j & 1 \\ -j & 1 & -j \end{bmatrix}$ | $\frac{1}{\sqrt{4}}\begin{bmatrix} 1 & -j & -1 & j \\ j & 1 & j & 1 \\ -1 & -j & 1 & j \\ -j & 1 & -j & 1 \end{bmatrix}$ |

TABLE 2-continued

| Codebook Index | Number of Layers | | | |
|---|---|---|---|---|
| | 1 | 2 | 3 | 4 |
| 4 | $\begin{bmatrix} 1 \\ \frac{1-j}{\sqrt{2}} \\ -j \\ \frac{-1-j}{\sqrt{2}} \end{bmatrix}$ | $\frac{1}{\sqrt{2}}\begin{bmatrix} 1 & \frac{-1+j}{\sqrt{2}} \\ \frac{1-j}{\sqrt{2}} & -j \\ -j & \frac{-1-j}{\sqrt{2}} \\ \frac{-1-j}{\sqrt{2}} & 1 \end{bmatrix}$ | $\frac{1}{\sqrt{3}}\begin{bmatrix} 1 & \frac{1+j}{\sqrt{2}} & \frac{-1+j}{\sqrt{2}} \\ \frac{1-j}{\sqrt{2}} & 1 & -j \\ -j & \frac{-1+j}{\sqrt{2}} & \frac{-1-j}{\sqrt{2}} \\ \frac{-1-j}{\sqrt{2}} & j & 1 \end{bmatrix}$ | $\frac{1}{\sqrt{4}}\begin{bmatrix} 1 & \frac{1+j}{\sqrt{2}} & j & \frac{-1+j}{\sqrt{2}} \\ \frac{1-j}{\sqrt{2}} & 1 & \frac{-1-j}{\sqrt{2}} & -j \\ -j & \frac{-1+j}{\sqrt{2}} & 1 & \frac{-1-j}{\sqrt{2}} \\ \frac{-1-j}{\sqrt{2}} & j & \frac{-1+j}{\sqrt{2}} & 1 \end{bmatrix}$ |
| 5 | $\begin{bmatrix} 1 \\ \frac{-1-j}{\sqrt{2}} \\ j \\ \frac{1-j}{\sqrt{2}} \end{bmatrix}$ | $\frac{1}{\sqrt{2}}\begin{bmatrix} 1 & \frac{1+j}{\sqrt{2}} \\ \frac{-1-j}{\sqrt{2}} & j \\ j & \frac{1-j}{\sqrt{2}} \\ \frac{1-j}{\sqrt{2}} & 1 \end{bmatrix}$ | $\frac{1}{\sqrt{3}}\begin{bmatrix} 1 & \frac{-1+j}{\sqrt{2}} & \frac{1+j}{\sqrt{2}} \\ \frac{-1-j}{\sqrt{2}} & 1 & j \\ j & \frac{1+j}{\sqrt{2}} & \frac{1-j}{\sqrt{2}} \\ \frac{1-j}{\sqrt{2}} & -j & 1 \end{bmatrix}$ | $\frac{1}{\sqrt{4}}\begin{bmatrix} 1 & \frac{-1+j}{\sqrt{2}} & -j & \frac{1+j}{\sqrt{2}} \\ \frac{-1-j}{\sqrt{2}} & 1 & \frac{1-j}{\sqrt{2}} & j \\ j & \frac{1+j}{\sqrt{2}} & 1 & \frac{1-j}{\sqrt{2}} \\ \frac{1-j}{\sqrt{2}} & -j & \frac{1+j}{\sqrt{2}} & 1 \end{bmatrix}$ |
| 6 | $\begin{bmatrix} 1 \\ \frac{-1+j}{\sqrt{2}} \\ -j \\ \frac{1+j}{\sqrt{2}} \end{bmatrix}$ | $\frac{1}{\sqrt{2}}\begin{bmatrix} 1 & j \\ \frac{-1+j}{\sqrt{2}} & \frac{1+j}{\sqrt{2}} \\ -j & 1 \\ \frac{1+j}{\sqrt{2}} & \frac{1-j}{\sqrt{2}} \end{bmatrix}$ | $\frac{1}{\sqrt{3}}\begin{bmatrix} 1 & j & \frac{1-j}{\sqrt{2}} \\ \frac{-1+j}{\sqrt{2}} & \frac{1+j}{\sqrt{2}} & -j \\ -j & 1 & \frac{1+j}{\sqrt{2}} \\ \frac{1+j}{\sqrt{2}} & \frac{1-j}{\sqrt{2}} & 1 \end{bmatrix}$ | $\frac{1}{\sqrt{4}}\begin{bmatrix} 1 & \frac{-1-j}{\sqrt{2}} & j & \frac{1-j}{\sqrt{2}} \\ \frac{-1+j}{\sqrt{2}} & 1 & \frac{1+j}{\sqrt{2}} & -j \\ -j & \frac{1-j}{\sqrt{2}} & 1 & \frac{1+j}{\sqrt{2}} \\ \frac{1+j}{\sqrt{2}} & j & \frac{1-j}{\sqrt{2}} & 1 \end{bmatrix}$ |
| 7 | $\begin{bmatrix} 1 \\ \frac{1+j}{\sqrt{2}} \\ j \\ \frac{-1+j}{\sqrt{2}} \end{bmatrix}$ | $\frac{1}{\sqrt{2}}\begin{bmatrix} 1 & -j \\ \frac{1+j}{\sqrt{2}} & \frac{-1+j}{\sqrt{2}} \\ j & 1 \\ \frac{-1+j}{\sqrt{2}} & \frac{-1-j}{\sqrt{2}} \end{bmatrix}$ | $\frac{1}{\sqrt{3}}\begin{bmatrix} 1 & -j & \frac{-1-j}{\sqrt{2}} \\ \frac{1+j}{\sqrt{2}} & \frac{-1+j}{\sqrt{2}} & j \\ j & 1 & \frac{-1-j}{\sqrt{2}} \\ \frac{-1+j}{\sqrt{2}} & \frac{-1-j}{\sqrt{2}} & 1 \end{bmatrix}$ | $\frac{1}{\sqrt{4}}\begin{bmatrix} 1 & \frac{1-j}{\sqrt{2}} & -j & \frac{-1-j}{\sqrt{2}} \\ \frac{1+j}{\sqrt{2}} & 1 & \frac{-1+j}{\sqrt{2}} & j \\ j & \frac{-1-j}{\sqrt{2}} & 1 & \frac{-1+j}{\sqrt{2}} \\ \frac{-1+j}{\sqrt{2}} & -j & \frac{-1-j}{\sqrt{2}} & 1 \end{bmatrix}$ |
| 8 | $\begin{bmatrix} 1 \\ 1 \\ -1 \\ -1 \end{bmatrix}$ | $\frac{1}{\sqrt{2}}\begin{bmatrix} 1 & 1 \\ 1 & 1 \\ -1 & 1 \\ -1 & 1 \end{bmatrix}$ | $\frac{1}{\sqrt{3}}\begin{bmatrix} 1 & 1 & -1 \\ 1 & 1 & 1 \\ -1 & 1 & -1 \\ -1 & 1 & 1 \end{bmatrix}$ | $\frac{1}{\sqrt{4}}\begin{bmatrix} 1 & 1 & -1 & -1 \\ 1 & 1 & 1 & 1 \\ -1 & 1 & 1 & -1 \\ -1 & 1 & -1 & 1 \end{bmatrix}$ |
| 9 | $\begin{bmatrix} 1 \\ -j \\ 1 \\ -j \end{bmatrix}$ | $\frac{1}{\sqrt{2}}\begin{bmatrix} 1 & j \\ -j & -1 \\ 1 & -j \\ -j & 1 \end{bmatrix}$ | $\frac{1}{\sqrt{3}}\begin{bmatrix} 1 & 1 & j \\ -j & j & -1 \\ 1 & 1 & -j \\ -j & j & 1 \end{bmatrix}$ | $\frac{1}{\sqrt{4}}\begin{bmatrix} 1 & j & 1 & j \\ -j & 1 & j & -1 \\ 1 & -j & 1 & -j \\ -j & -1 & j & 1 \end{bmatrix}$ |
| 10 | $\begin{bmatrix} 1 \\ -1 \\ -1 \\ 1 \end{bmatrix}$ | $\frac{1}{\sqrt{2}}\begin{bmatrix} 1 & -1 \\ -1 & -1 \\ -1 & 1 \\ 1 & 1 \end{bmatrix}$ | $\frac{1}{\sqrt{3}}\begin{bmatrix} 1 & -1 & -1 \\ -1 & 1 & -1 \\ -1 & -1 & 1 \\ 1 & 1 & 1 \end{bmatrix}$ | $\frac{1}{\sqrt{4}}\begin{bmatrix} 1 & -1 & -1 & 1 \\ -1 & 1 & -1 & 1 \\ -1 & -1 & 1 & 1 \\ 1 & 1 & 1 & 1 \end{bmatrix}$ |
| 11 | $\begin{bmatrix} 1 \\ j \\ 1 \\ j \end{bmatrix}$ | $\frac{1}{\sqrt{2}}\begin{bmatrix} 1 & 1 \\ j & -j \\ 1 & 1 \\ j & -j \end{bmatrix}$ | $\frac{1}{\sqrt{3}}\begin{bmatrix} 1 & 1 & -j \\ j & -j & -1 \\ 1 & 1 & j \\ j & -j & 1 \end{bmatrix}$ | $\frac{1}{\sqrt{4}}\begin{bmatrix} 1 & -j & 1 & -j \\ j & 1 & -j & -1 \\ 1 & j & 1 & j \\ j & -1 & -j & 1 \end{bmatrix}$ |

TABLE 2-continued

| Codebook Index | Number of Layers | | | |
|---|---|---|---|---|
| | 1 | 2 | 3 | 4 |
| 12 | $\begin{bmatrix} 1 \\ 1 \\ 1 \\ -1 \end{bmatrix}$ | $\frac{1}{\sqrt{2}}\begin{bmatrix} 1 & 1 \\ 1 & 1 \\ 1 & -1 \\ -1 & 1 \end{bmatrix}$ | $\frac{1}{\sqrt{3}}\begin{bmatrix} 1 & 1 & 1 \\ 1 & 1 & -1 \\ 1 & -1 & 1 \\ -1 & 1 & 1 \end{bmatrix}$ | $\frac{1}{\sqrt{4}}\begin{bmatrix} 1 & 1 & 1 & -1 \\ 1 & 1 & -1 & 1 \\ 1 & -1 & 1 & 1 \\ -1 & 1 & 1 & 1 \end{bmatrix}$ |
| 13 | $\begin{bmatrix} 1 \\ 1 \\ -1 \\ 1 \end{bmatrix}$ | $\frac{1}{\sqrt{2}}\begin{bmatrix} 1 & -1 \\ 1 & 1 \\ -1 & 1 \\ 1 & 1 \end{bmatrix}$ | $\frac{1}{\sqrt{3}}\begin{bmatrix} 1 & 1 & -1 \\ 1 & 1 & 1 \\ -1 & 1 & 1 \\ 1 & -1 & 1 \end{bmatrix}$ | $\frac{1}{\sqrt{4}}\begin{bmatrix} 1 & 1 & -1 & 1 \\ 1 & 1 & 1 & -1 \\ -1 & 1 & 1 & 1 \\ 1 & -1 & 1 & 1 \end{bmatrix}$ |
| 14 | $\begin{bmatrix} 1 \\ -1 \\ 1 \\ 1 \end{bmatrix}$ | $\frac{1}{\sqrt{2}}\begin{bmatrix} 1 & 1 \\ -1 & 1 \\ 1 & 1 \\ 1 & -1 \end{bmatrix}$ | $\frac{1}{\sqrt{3}}\begin{bmatrix} 1 & -1 & 1 \\ -1 & 1 & 1 \\ 1 & 1 & 1 \\ 1 & 1 & -1 \end{bmatrix}$ | $\frac{1}{\sqrt{4}}\begin{bmatrix} 1 & -1 & 1 & 1 \\ -1 & 1 & 1 & 1 \\ 1 & 1 & 1 & -1 \\ 1 & 1 & -1 & 1 \end{bmatrix}$ |
| 15 | $\begin{bmatrix} 1 \\ -1 \\ -1 \\ -1 \end{bmatrix}$ | $\frac{1}{\sqrt{2}}\begin{bmatrix} 1 & -1 \\ -1 & 1 \\ -1 & -1 \\ -1 & -1 \end{bmatrix}$ | $\frac{1}{\sqrt{3}}\begin{bmatrix} 1 & -1 & -1 \\ -1 & 1 & -1 \\ -1 & -1 & 1 \\ -1 & -1 & -1 \end{bmatrix}$ | $\frac{1}{\sqrt{4}}\begin{bmatrix} 1 & -1 & -1 & -1 \\ -1 & 1 & -1 & -1 \\ -1 & -1 & 1 & -1 \\ -1 & -1 & -1 & 1 \end{bmatrix}$ |

<Closed-Loop MIMO>

A method using a precoding weight similar to a channel according to a channel condition is called a closed-loop MIMO scheme, and a method of using the precoding weight according to a specific rule irrespective of the channel condition is called an open-loop MIMO scheme.

An amount of a precoding weight reported for the closed-loop MIMO by a receiver may vary depending on a frequency unit, a reporting period, etc. If one precoding weight is defined as a frequency range, a system bandwidth can be classified into a wideband (WB), a subband (SB), a bestband (BB), etc., according to the frequency range. The SB may include at least one subcarrier, and the WB may include at least one SB. The BB implies a band having a good channel state as a result of channel measurement of the receiver. In the codebook-based precoding, a defined PMI is fed back. The PMI may be defined as a WB PMI, an SB PMI, and a BB PMI according to a range of applying the PMI. Among the defined precoding matrixes, a PMI capable of maximizing an average throughput of a specific band is selected. The narrower the range of applying the PMI, the better the performance.

If a resource block is defined as an aggregation of 12 contiguous subcarriers, a system bandwidth and an SB can be expressed by regarding the resource block as a basic unit. Table 3 shows an example of expressing the system bandwidth and the SB by regarding the resource block as the basic unit.

TABLE 3

| System bandwidth | Subband size | M (number of bestband) |
|---|---|---|
| 6-7 | Wideband CQI only | Wideband CQI only |
| 8-11 | 2 | 1 |
| 11-26 | 2 | 3 |
| 27-63 | 3 | 5 |
| 64-110 | 4 | 6 |

The WB may be defined as the system bandwidth, and may be defined as a maximum unit for calculating a CQI. The SB may be defined as k contiguous resource blocks, and may be defined as a minimum unit for calculating the CQI. The number of BBs may be determined according to the system bandwidth.

A size of the SB may be defined differently depending on the system bandwidth. Values of the same magnitude may be used for a range of CQI calculation and a range of PMI application. A method used for the CQI calculation and the PMI application will be described by taking a system having 24 resource blocks as the system bandwidth for example.

(1) When transmitting a WB CQI/WB, the receiver selects a PMI capable of maximizing an average throughput of 24 resource blocks, and calculates an average CQI of the 24 resource blocks by applying the selected PMI. The receiver may obtain one WB CQI and one WB PMI.

(2) When transmitting an SB CQI/SB PMI, the receiver selects a PMI for SBs consisting of 2 resource blocks and calculates an average CQI. The receiver may obtain 12 SB CQIs and 12 SB PMIs.

(3) When transmitting an SB CQI/WB PMI, the receiver selects a PMI capable of maximizing an average throughput of the 24 resource blocks, and calculates an average CQI in a unit of 2 resource blocks by using the PMI (12 CQIs and 1 PMI). The receiver may obtain 12 SB CQIs and one WB PMI.

(4) When transmitting a WB CQI/SB PMI, the receiver selects a PMI in a unit of 2 resource blocks and calculates an average CQI of the 24 resource blocks by applying the selected PMIs. The receiver may obtain one WB CQI and 12 SB PMIs.

(5) When transmitting a best M average CQI/PMI and a WB CQI/PMI, the receiver selects 3 SBs having the highest throughput among SBs in a unit of 2 resource blocks and selects a PMI for a BB (2×3=6 resource blocks (RBs)) to calculate an average CQI of the BB. Further, the receiver selects a PMI for the 24 resource blocks and calculates a CQI.

<Opportunistic Beamforming>

When considering scheduling to allocate resources to users of which a channel condition is in an almost maximum state, a multi-user diversity gain decreases in a static channel condition where a channel of each user changes slowly. Spatial signal processing may be performed in such a static channel condition to allow the channel condition to be changed much and faster, thereby increasing a multi-user gain. This is called an opportunistic beamforming scheme. When applying the opportunistic beamforming scheme, a BS can obtain the same effect as if a beam is formed in an irregular direction by applying a precoding weight having an irregular-type size and phase to each antenna. Accordingly, a channel condition of each user changes more dynamically. Therefore, when using the opportunistic beamforming scheme in a channel condition where a channel changes slowly while using the scheduling scheme together, a greater multi-user diversity gain can be obtained. In addition, in an OFDMA system, a different precoding weight can be applied for each frequency resource, and a scheduling gain can be obtained by making a frequency flat channel to a frequency selective channel. Examples of the frequency resource used in the OFDMA system include a subblock, a resource block, a subcarrier, etc.

A codebook-based precoding scheme reports a PMI by selecting a precoding matrix which is the most similar to a channel condition among predetermined precoding matrixes and can advantageously decrease overhead caused by feedback data. However, since a codebook is configured by combining codebook sets capable of representing a spatial channel, more codebook sets have to be combined to constitute the codebook in proportion to the number of Tx antennas. Designing of the codebook becomes difficult as the number of Tx antennas increases, and the overhead of the feedback data may increase as a size of the codebook increases.

Now, a method of applying the codebook-cased precoding scheme to an extended Tx antenna by utilizing a conventionally defined codebook will be described.

Figure 4:
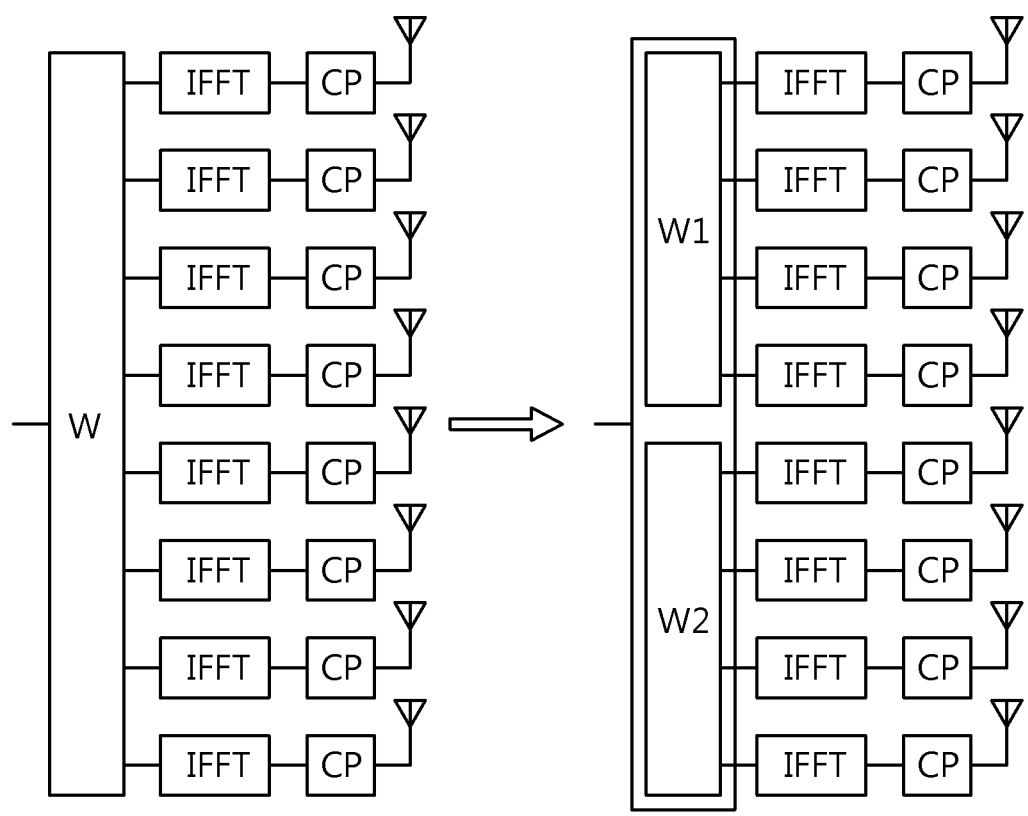
FIG. 4 shows antenna clustering according to an embodiment of the present invention.

FIG. 4 shows antenna clustering according to an embodiment of the present invention.

Referring to FIG. 4, antenna clustering and channel dependent precoding/channel independent precoding are used to apply a codebook-based precoding scheme to an extended Tx antenna. When a precoding weight is configured for codebook-based precoding of a transmitter having the extended antenna, channel dependent precoding using the conventional codebook is applied to some of precoding weights, and channel independent precoding using the conventional codebook is applied to the remaining precoding weights.

The antenna clustering configures Z antenna clusters by aggregating P Tx antennas into N groups (where P, N, and Z are integers greater than 0). The channel dependent precoding may be applied to k antenna clusters, and the channel independent precoding may be applied to (z−k) antenna clusters (where z and k are integers satisfying Z>k>0). For example, as shown in the figure, two antenna clusters may be configured by aggregating four antennas in 8Tx transmission, and the channel dependent precoding may be applied to one antenna cluster whereas the channel independent precoding may be applied to the other antenna cluster. An antenna cluster having N antennas can support ranks 1 to N. A PMI indicating a maximum throughput can be selected and used by using codebooks of the ranks 1 to N in each antenna cluster.

When a precoding weight is configured for the codebook-based precoding scheme of a transmitter having an extended antenna, some of precoding weights use channel dependent precoding and the remaining precoding weights use channel independent precoding. The channel dependent precoding selects the precoding weight on the basis of a CQI, PMI, RI, or the like included in feedback data reported by a UE. The channel dependent precoding is used in a closed-loop MIMO scheme. The channel independent precoding uses the precoding weight according to a specific rule irrespective of a channel condition. The channel independent precoding is used in an open-loop MIMO scheme.

Equation 9 shows a precoding weight matrix including a precoding weight $W_z(i)$ having a layer with a size of $V_z$ in a $Z^{th}$ antenna cluster having $P_z$ Tx antennas.

$$W(i) = \begin{bmatrix} W_0(i) & 0 & \cdots & 0 \\ 0 & W_1(i) & \cdots & 0 \\ \vdots & \vdots & \ddots & \vdots \\ 0 & 0 & \cdots & W_{Z-1}(i) \end{bmatrix}$$ [Equation 9]

In Equation 9, $W_z(i)$ denotes a precoding weight $P_z \times V_z$ for a $z^{th}$ antenna cluster, $P_z$ denotes the number of Tx antennas for the $z^{th}$ antenna cluster, $V_z$ denotes the number of layers for the $z^{th}$ antenna cluster, $W(i)$ denotes a precoding weight $P \times V$ matrix for a Tx antenna, P denotes the number of all Tx antennas, V denotes the number of all layers and is expressed by $$V = \sum_{z=0,\ldots,Z-1} V_z,$$

$i=0, 1, \ldots, M_{symb}^{layer}-1$, and $M_{symb}^{layer}$ denotes the number of modulation symbols per layer. A precoding weight for each antenna cluster may be a precoding matrix predefined in the conventional system. For example, the precoding weight for each antenna cluster may be a precoding matrix of a codebook for 4Tx or 2Tx transmission defined in a 4Tx system.

When a precoding weight $W_z(i)$ having a layer with a size $V_z$ is selected from the $z^{th}$ antenna cluster having $P_z$ Tx antennas, $W_z(i)$ is a $P_z \times V_z$ matrix To enable transmission of a different rank in each antenna cluster, precoding weight matrixes of antenna clusters are configured in a block diagonal shape. Therefore, a precoding weight matrix used in the transmitter may be a $P \times V$ matrix configured in a diagonal shape. In a matrix having the block diagonal shape, elements (1,1), (2,2), (3,3) . . . (m,n) or (1,n), (2,n−1), (3,n−2) . . . (m,1) are set to non-zero values, and the remaining elements are set to 0 (herein, m denotes a row position and n denotes a column position, where m and n are integers satisfying m,n>0).

Among Z antenna clusters, any M antenna clusters may use channel dependent precoding, and (Z−M) antenna clusters may use channel independent precoding. A rank may be transmitted for each of the Z antenna clusters, or only one piece of rank information may be transmitted according to a predetermined rule. Regarding a PMI, only a PMI of an antenna cluster using the channel dependent precoding is reported. A CQI may be reported in accordance with a codeword used in each antenna cluster.

Equation 10 shows a precoding weight matrix for 2 antenna clusters.

$$W(i) = \begin{bmatrix} W_0(i) & 0 \\ 0 & W_1(i) \end{bmatrix}$$ [Equation 10]

For example, when two antenna clusters are configured by aggregating four antennas in 8Tx transmission, the channel depending precoding may be applied to a first antenna cluster and the channel independent precoding may be applied to a second antenna cluster. A rank can be selected independently in each antenna cluster. A report on the selected rank may be transmitted in such a manner that: (1) the report is transmitted in each of two antenna clusters; or (2) one piece of rank information is reported according to a rank combination predetermined according to a codeword.

Since the channel independent precoding is used in one antenna cluster, regarding a PMI, only a PMI of an antenna cluster using the channel dependent precoding is reported. A report amount of the PMI may be determined according to a CQI/PMI reporting method.

Table 4 shows feedback data based on two antenna clusters according to a rank/CQI/PMI reporting method of the conventional system (i.e., 4Tx system) when the channel dependent precoding and the channel independent precoding are used and one piece of rank information is transmitted.

A physical antenna to which antenna clusters are mapped may be selected by using an antenna switching matrix. The antenna switching matrix can be applied to a precoding weight matrix configured with the channel dependent precoding and the channel independent precoding, and this is expressed by Equation 11 below.

$$AW(i)$$ [Equation 11]

In Equation 11, A denotes an antenna switching matrix P×P, and W(i) is a precoding weight matrix P×V. The antenna switching matrix can create P! types of matrixes. For example, if a 8Tx system is assumed, the number of types of antenna switching matrixes for mapping a precoding weight to a physical antenna may be 8!.

Equation 12 shows physical antennas $A_0$ to $A_3$ to which precoding is mapped.

TABLE 4

| Reporting Format | | 1 | 2 | 3 | 4 | 5 |
|---|---|---|---|---|---|---|
| 1st Antenna Cluster | | Rank 1 | Rank 1 (CW: 1) | Rank 1 (CW: 1) | Rank 2~4 (CW: 1, 2) | Rank 2~4 (CW: 1, 2) |
| 2nd Antenna Cluster | | | Rank 1 (CW: 3) | Rank 2~4 (CW: 3, 4) | Rank 1 (CW: 3) | Rank 2~4 (CW: 3, 4) |
| WB CQI/WB PMI | | Rank WB CQI | Rank WB CQI(1) WB CQI(3) WB PMI(for 1st AC) | Rank WB CQI(1) WBCQI (3) WBCQI (4) WB PMI(for 1st AC) | Rank WB CQI(1) WBCQI (2) WBCQI (3) WB PMI(for 1st AC) | Rank WB CQI(1) WBCQI (2) WBCQI (3) WBCQI (4) WB PMI(for 1st AC) |
| Best M CQI/PMI (1) | | Rank WB CQI BB CQI WB PMI(for 1st AC) Best Band Index | Rank WB CQI(1) WB CQI(3) BBCQI(1) BBCQI(3) WB PMI(for 1st AC) Best Band Index | Rank WB CQI(1) WB CQI(3) WB CQI(4) BBCQI(1) BBCQI(4) WB PMI(for 1st AC) Best Band Index | Rank WB CQI(1) WB CQI(2) WB CQI(3) BBCQI(1) BBCQI(2) BBCQI(3) WB PMI(for 1st 'AC) Best Band Index | Rank WB CQI(1) WB CQI(2) WB CQI(3) WB CQI(4) BBCQI(1) BBCQI(2) BBCQI(3) BBCQI(4) WB PMI(for 1st AC) Best Band Index |
| WB CQI/SB PMIs | | Rank WBCQI SB PMIs(for 1st AC) | Rank WBCQI(1) WBCQI(3) SB PMIs(for 1st AC) | Rank WBCQI(1) WBCQI(3) WBCQI(4) SB PMIs(for 1st AC) | Rank WBCQI(1) WBCQI(2) WBCQI(3) SB PMIs(for 1st AC) | Rank WBCQI(1) WBCQI(2) WBCQI(3) WBCQI(4) SB PMIs(for 1st AC) |
| Best M CQI/PMI (2) | | Rank WB CQI BB CQI WB PMI(for 1st AC) BB PMI(for 1st AC) Best Band Index | Rank WB CQI(1) WB CQI(3) BB CQI(1) BB CQI(3) WB PMI(for 1st AC) BB PMI(for 1st AC) Best Band Index | Rank WB CQI(1) WB CQI(3) WB CQI(4) BB CQI(1) BB CQI(3) BB CQI(4) WB PMI(for 1st AC) BB PMI(for 1st AC) Best Band Index | Rank WB CQI(1) WB CQI(2) WB CQI(3) BB CQI(1) BB CQI(2) BB CQI(3) WB PMI(for 1st AC) BB PMI(for 1st AC) Best Band Index | Rank WB CQI(1) WB CQI(2) WB CQI(3) WB CQI(4) BB CQI(1) BB CQI(2) BB CQI(3) BB CQI(4) WB PMI(for 1st AC) BB PMI(for 1st AC) Best Band Index |
| SB CQIs/WB PMI | | Rank WB CQI SB CQIs WB PMI(for 1st AC) | Rank WB CQI(1) WB CQI(3) SB CQIs(1) SB CQIs(3) WB PMI(for 1st AC) | Rank WB CQI(1) WB CQI(3) WB CQI(4) SB CQIs(1) SB CQIs(3) SB CQIs(4) WB PMI(for 1st AC) | Rank WB CQI(1) WB CQI(2) WB CQI(3) SB CQIs(1) SB CQIs(2) SB CQIs(3) WB PMI(for 1st AC) | Rank WB CQI(1) WB CQI(2) WB CQI(3) WB CQI(4) SB CQIs(1) SB CQIs(2) SB CQIs(3) SB CQIs(4) WB PMI(for 1st AC) |

$$A_0 = \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{bmatrix}$$ [Equation 12]

$$A_1 = \begin{bmatrix} 1 & 0 & 0 & 0 & 0 & 0 & 0 & 0 \\ 0 & 0 & 0 & 0 & 1 & 0 & 0 & 0 \\ 0 & 1 & 0 & 0 & 0 & 0 & 0 & 0 \\ 0 & 0 & 0 & 0 & 0 & 1 & 0 & 0 \\ 0 & 0 & 1 & 0 & 0 & 0 & 0 & 0 \\ 0 & 0 & 0 & 0 & 0 & 0 & 1 & 0 \\ 0 & 0 & 0 & 1 & 0 & 0 & 0 & 0 \\ 0 & 0 & 0 & 0 & 0 & 0 & 0 & 1 \end{bmatrix}$$

$$A_2 = \begin{bmatrix} 0 & 0 & 0 & 1 & 0 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \\ 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \end{bmatrix}$$

$$A_3 = \begin{bmatrix} 0 & 0 & 0 & 1 & 0 & 0 & 0 & 0 \\ 1 & 0 & 0 & 0 & 0 & 0 & 0 & 0 \\ 0 & 0 & 0 & 0 & 0 & 1 & 0 & 0 \\ 0 & 1 & 0 & 0 & 0 & 0 & 0 & 0 \\ 0 & 0 & 0 & 0 & 0 & 0 & 1 & 0 \\ 0 & 0 & 1 & 0 & 0 & 0 & 0 & 0 \\ 0 & 0 & 0 & 0 & 0 & 0 & 0 & 1 \\ 0 & 0 & 0 & 1 & 0 & 0 & 0 & 0 \end{bmatrix}$$

Table 5 shows the number of physical antennas to which precoding is mapped.

TABLE 5

|  | Antenna Cluster #1 | Antenna Cluster #2 |
|---|---|---|
| $A_0$ | 1, 2, 3, 4 | 5, 6, 7, 8 |
| $A_1$ | 1, 3, 5, 7 | 2, 4, 6, 8 |
| $A_2$ | 5, 6, 7, 8 | 1, 2, 3, 4 |
| $A_3$ | 2, 4, 6, 8 | 1, 3, 5, 7 |

In case of $A_0$, the antenna cluster #1 is mapped to $1^{st}$, $2^{nd}$, $3^{rd}$, and $4^{th}$ antennas, and the antenna cluster #2 is mapped to $5^{th}$, $6^{th}$, $7^{th}$, and $8^{th}$ antennas. In case of $A_1$, the antenna cluster #1 is mapped to $1^{st}$, $3^{rd}$, $5^{th}$, and $7^{th}$ antennas, and the antenna cluster #2 is mapped to $2^{nd}$, $4^{th}$, $6^{th}$, and $8^{th}$ antennas. $A_2$ and $A_3$ have a swapping relation with $A_o$ and $A_1$, respectively.

In the channel independent precoding, the same precoding weight may be used in a resource block or subband, i.e., a basic unit of resource allocation, and a different precoding weight may be used in an adjacent resource block or subband.

Table 6 shows an example of a band size to which the channel dependent precoding and the channel independent precoding are applied.

TABLE 6

|  | Channel dependent precoding | Channel independent precoding |
|---|---|---|
| 1 | WB | SB |
| 2 | SB | SB |
| 3 | BB | SB |

The channel independent precoding may always be applied to an SB, and the channel dependent precoding may be applied to a WB, an SB, a BB, or the like which is defined according to a reporting method.

A combination of the channel dependent precoding and the channel independent precoding and a combination between one channel dependent precoding and another channel dependent precoding may be used according to a rank. Table 7 shows an example of the precoding combination according to the rank.

TABLE 7

| Rank | Precoding |
|---|---|
| 1~4 | Channel Dependant + Channel Independent |
| 5~8 | Channel Dependant + Channel Dependant |

The combination of the channel dependent precoding and the channel independent precoding may be used in ranks 1 to 4, and the channel dependent precoding may be used in ranks 5 to 8 in each antenna cluster. Overhead of feedback data can be reduced in the ranks 1 to 4, and 8Tx transmission capability can be improved.

<Method of Configuring Some Antenna Clusters to One Antenna Cluster>

A method of configuring some antenna clusters to one antenna cluster will be described in order to support the legacy UE in a system using an extended antenna.

An antenna cluster having $P_Z$ Tx antennas may be regarded as one virtual antenna by being combined using a phase vector $D_z(i)$. That is, Z antenna clusters may be regarded as Z virtual antennas. The precoding weight matrix is a Z×V matrix used for virtual antenna transmission, and can be expressed by Equation 13 below.

$$D(i)W(i) = \begin{bmatrix} D_0(i) & 0 & \cdots & 0 \\ 0 & D_1(i) & \cdots & 0 \\ \vdots & \vdots & \ddots & \vdots \\ 0 & 0 & \cdots & D_{Z-1}(i) \end{bmatrix} W(i)$$ [Equation 13]

$$D_z(i) = [\, e^{j\theta_0 i} \;\; e^{j\theta_1 i} \;\; \cdots \;\; e^{j\theta_{P_z-1} i} \,]^T$$

$$\theta_p = -2\pi \cdot k_i \cdot p \cdot \delta, \quad p = 0, \ldots, P_z - 1$$

In Equation 13, W(i) denotes a precoding weight matrix Z×V, Z denotes the number of antennas, and V denotes the number of layers.

Since a pilot used for antenna identification is transmitted by multiplying the $D_z(i)$, the same effect as being transmitted through one antenna can be obtained, and the receiver can demodulate data by estimating a channel of a virtual antenna and can select a precoding weight.

When an identical number of antennas are included in all antenna clusters, a phase of the $D_z(i)$ can be equally applied to all antenna clusters, and this can be expressed by Equation 14.

$$D(i)\tilde{I}W(i) = \begin{bmatrix} D_0(i) & 0 & \cdots & 0 \\ 0 & D_1(i) & \cdots & 0 \\ \vdots & \vdots & \ddots & \vdots \\ 0 & 0 & \cdots & D_{Z-1}(i) \end{bmatrix} \tilde{I}W(i)$$ [Equation 14]

$$D_z(i) = \begin{bmatrix} e^{j\theta_0 i} & 0 & \cdots & 0 \\ 0 & e^{j\theta_1 i} & \cdots & 0 \\ \vdots & \vdots & \ddots & \vdots \\ 0 & 0 & \cdots & e^{j\theta_{P_Z-1} i} \end{bmatrix}$$

$$\theta_p = -2\pi \cdot k_i \cdot p \cdot \delta, \quad p = 0, \ldots, P_z - 1$$

$$\tilde{I} = \begin{bmatrix} A_{P_0} & O_{P_0} & \cdots & O_{P_0} \\ O_{P_1} & A_{P_1} & \cdots & O_{P_1} \\ \vdots & \vdots & \ddots & \vdots \\ O_{P_{Z-1}} & O_{P_{Z-1}} & \cdots & A_{P_{Z-1}} \end{bmatrix}$$

$A_m$: $m \times 1$ array of all ones $O_m$: $m \times 1$ array of all zeros

When an antenna cluster (1,5) is configured by aggregating a $1^{st}$ antenna and a $5^{th}$ antenna in the 8Tx system and the remaining antennas are aggregated into antenna clusters (2,6), (3,7), and (4,8), a weight of Equation 31 can be used.

$$AD(i)\tilde{I} = \begin{bmatrix} 1 & 0 & 0 & 0 & 0 & 0 & 0 & 0 \\ 0 & 0 & 1 & 0 & 0 & 0 & 0 & 0 \\ 0 & 0 & 0 & 0 & 1 & 0 & 0 & 0 \\ 0 & 0 & 0 & 0 & 0 & 0 & 1 & 0 \\ 0 & 1 & 0 & 0 & 0 & 0 & 0 & 0 \\ 0 & 0 & 0 & 1 & 0 & 0 & 0 & 0 \\ 0 & 0 & 0 & 0 & 0 & 1 & 0 & 0 \\ 0 & 0 & 0 & 0 & 0 & 0 & 0 & 1 \end{bmatrix}$$ [Equation 15]

$$\begin{bmatrix} 1 & 0 & 0 & 0 & 0 & 0 & 0 & 0 \\ 0 & e^{-j\frac{4\pi}{\eta}k_i} & 0 & 0 & 0 & 0 & 0 & 0 \\ 0 & 0 & 1 & 0 & 0 & 0 & 0 & 0 \\ 0 & 0 & 0 & e^{-j\frac{4\pi}{\eta}k_i} & 0 & 0 & 0 & 0 \\ 0 & 0 & 0 & 0 & 1 & 0 & 0 & 0 \\ 0 & 0 & 0 & 0 & 0 & e^{-j\frac{4\pi}{\eta}k_i} & 0 & 0 \\ 0 & 0 & 0 & 0 & 0 & 0 & 1 & 0 \\ 0 & 0 & 0 & 0 & 0 & 0 & 0 & e^{-j\frac{4\pi}{\eta}k_i} \end{bmatrix}$$

$$\begin{bmatrix} 1 & 0 & 0 & 0 \\ 1 & 0 & 0 & 0 \\ 0 & 1 & 0 & 0 \\ 0 & 1 & 0 & 0 \\ 0 & 0 & 1 & 0 \\ 0 & 0 & 1 & 0 \\ 0 & 0 & 0 & 1 \\ 0 & 0 & 0 & 1 \end{bmatrix}$$

-continued $$= \begin{bmatrix} 1 & 0 & 0 & 0 \\ 0 & 1 & 0 & 0 \\ 0 & 0 & 1 & 0 \\ 0 & 0 & 0 & 1 \\ e^{-j\frac{4\pi}{\eta}k_i} & 0 & 0 & 0 \\ 0 & e^{-j\frac{4\pi}{\eta}k_i} & 0 & 0 \\ 0 & 0 & e^{-j\frac{4\pi}{\eta}k_i} & 0 \\ 0 & 0 & 0 & e^{-j\frac{4\pi}{\eta}k_i} \end{bmatrix}$$

As described above, when some of precoding weights use channel dependent precoding and the remaining precoding weights use channel independent precoding, a scheduling gain can be obtained by opportunistic beamforming, and a throughput obtained by the channel dependent precoding can be maximized.

The present invention can be implemented using software, which is designed to perform the above-described functions, or a processor such as a microprocessor according to program code, a controller, a microcontroller, and an Application Specific Integrated Circuit (ASIC). The design, development and implementation of the code is obvious to one skilled in the art based on the description of the present invention.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

The invention claimed is:

1. A data transmission method in a multiple antenna system, the method comprising:
    generating a transmit (Tx) signal in a plurality of antennas by applying a precoding weight matrix to first and second antenna clusters including the plurality of antennas, wherein:
    the precoding weight matrix is a block diagonal matrix that is configured with a precoding weight corresponding to the first antenna cluster and a precoding weight corresponding to the second antenna cluster;
    the precoding weight corresponding to the first antenna cluster is selected according to a channel condition; and
    the precoding weight corresponding to the second antenna cluster is different from the precoding weight corresponding to the first antenna cluster and is selected according to a specific rule irrespective of the channel condition in order to receive feedback data for only the first antenna cluster, the feedback data including a precoding matrix indicator (PMI);
    transmitting the Tx signal; and
    receiving the PMI for selection of the precodinq weight corresponding to the first antenna cluster,
    wherein:
    a whole frequency band includes a plurality of subbands each including a plurality of subcarriers; and
    the precodinq weight corresponding to the second antenna cluster is applied to each of the plurality of subbands.

2. The data transmission method of claim 1, wherein:
    the precoding weight corresponding to the first antenna cluster or the precoding weight corresponding to the second antenna cluster is a P*V precoding matrix where P denotes a number of Tx antennas included in the first or second antenna cluster and V denotes a number of layers applied to the first or second antenna cluster; and P and V are integers that are greater than 0.

3. The data transmission method of claim 1, wherein the Tx signal is generated by applying an antenna switching matrix, which is used to map the first antenna cluster and the second antenna cluster to a physical antenna, to the precoding weight matrix.

4. The data transmission method of claim 1, wherein the precoding weight corresponding to the first antenna cluster is applied to the whole frequency band or the plurality of sub-bands.

5. The data transmission method of claim 1, wherein the first antenna cluster and the second antenna cluster are combined using a phase vector, and the precoding weight matrix is used for virtual antenna transmission.

\* \* \* \* \*